United States Patent [19]

Yip

[11] 3,852,489

[45] Dec. 3, 1974

[54] FOOD PRODUCTS AND THE PRESERVATION AND ENHANCING OF THE APPEARANCE THEREOF

[75] Inventor: Sun W. Yip, Vancouver, British Columbia, Canada

[73] Assignee: New England Fish Company, Seattle, Wash.

[22] Filed: Feb. 22, 1974

[21] Appl. No.: 444,992

Related U.S. Application Data

[63] Continuation-in-part of Ser. No. 348,770, April 6, 1973, abandoned.

[52] U.S. Cl................. 426/212, 426/268, 426/269, 426/323, 426/376
[51] Int. Cl.............................................. A23b 3/00
[58] Field of Search .......... 426/148, 151, 212, 224, 426/262, 265, 327, 376

[56] References Cited

UNITED STATES PATENTS

| | | | |
|---|---|---|---|
| 1,927,123 | 9/1933 | Howe | 426/268 |
| 2,294,428 | 9/1942 | Stockhamer | 426/7 |

*Primary Examiner*—A. Louis Monacell
*Assistant Examiner*—R. A. Yoncoskie
*Attorney, Agent, or Firm*—Synnestvedt & Lechner

[57] ABSTRACT

A process of preserving or enhancing the appearance, and especially the color, of fish roe, particularly salmon roe, which features the impregnation of the roe with citrate or sulfite, and especially a mixture thereof; and also the resulting product.

20 Claims, No Drawings

FOOD PRODUCTS AND THE PRESERVATION AND ENHANCING OF THE APPEARANCE THEREOF

CROSS-REFERENCE TO RELATED APPLICATION

This application is a continuation-in-part of my copending U.S. application Ser. No. 348,770, filed Apr. 6, 1973, now abandoned.

FIELD OF THE INVENTION

This invention relates to food products and to preserving and enhancing the appearance, especially the color, thereof. More particularly this invention relates to preserving the color, and thus the appearance of fish roe, particularly salmon roe, also generally referred to as "skeins" of roe.

Fresh salmon roe is reddish in color. However, red-colored salmon roe tends to turn brown. This discoloration leaves the salmon roe with an unappetizing appearance. The rate at which the brown discoloration of the reddish colored salmon roe takes place increases the higher the temperature of storage of the roe. For example, brown discoloration of the roe is noticeable within a day or a few days when the roe is stored at room temperature. When stored at sub-freezing temperatures, the brown discoloration is noticeable after several months. Salmon roe is often stored at sub-freezing temperatures for many months from the time it is packed until it is marketed in order to maintain the edibility of the roe. Although the edibility of the roe can be preserved by such sub-freezing storage, roe may nevertheless turn brown during such long storage.

REPORTED DEVELOPMENTS

A method that has been used heretofore to preserve the red color of salmon roe has involved treating the roe with nitrite, for example, potassium nitrite. Various theories have been advanced as to how the nitrite functions. For example, it has been proposed that through some relatively complex reactions, which involve the nitrite functioning as a reducing agent, the formation of brown Heme pigment, metmyoglobin in the roe is deterred. Also, there is information that supports the theory that the nitrite functions in a manner such that it contributes to the formation of a bright red artificial color in the roe. A typical process for preparing salmon roe for market has included the use of the following steps. Skeins of roe are rinsed with fresh water and then rinsed in a dilute salt (NaCl) solution to clean them. After withdrawing the roe from the salt solution and allowing the roe to drain, they are placed in a brine solution containing a water soluble nitrite compound, for example, sodium nitrite. The roe is agitated in the brine solution until the salt content thereof reaches a valve of about 5 to about 10 wt. percent. The salt helps to preserve the edibility of the roe and adds flavor thereto. After the roe are removed from the brine solution and allowed to drain, they are packed and salted with fine salt. The packed roe are generally allowed to stand at room temperature for several days after which they are examined for quality. Prior to final packaging, a coating of vegetable oil can be applied to the top surface of the roe. The vegetable oil imparts a glossy, appealing appearance to the roe. The packaged roe are then stored at low temperatures, for example, $-4°$ to $-10°F$, until marketing.

As mentioned above, the use of nitrite is effective in preserving the reddish color of salmon roe. However, there have been reports which link nitrites to producing harmful effects on the body.

Accordingly, it is an object of this invention to provide an improved process for preserving and enhancing the appearance of fish roe, and to produce an improved product.

It is another object of this invention to provide an improved process for preserving and enhancing the appearance of salmon roe utilizing a color-set additive which does not detrimentally affect the quality, nutrient value and edibility of the roe, and which is recognized by regulatory agencies as an additive acceptable for use in comestibles.

It is another object of this invention to provide an improved process for preserving the red color of salmon roe by a procedure which is compatible with, and can readily be carried out in conjunction with, heretofore known steps customarily involved in the preservation and packing of salmon roe.

How the foregoing objects and attendant advantages are accomplished will be apparent from the following description of the invention. Although having wider possible applications, the preferred procedure of the invention will include a description of the preservation and packing of what has become known as sujiko, which is a salmon roe product suitably preserved, as with a rather heavy concentration of salt, and color-set by means of an additive. It will be understood that the preferred description is to be deemed as exemplary rather than limitative.

SUMMARY OF THE INVENTION

Broadly, the invention contemplates the treatment of fish roe, particularly salmon roe, with a color-setting material comprising an edible (non-toxic in the amounts used) citrate and/or sulfite, the the term "sulfite" including "$SO_3$," and also bisulfite ($HSO_3$), hydrosulfite ($S_2O_4$), and metabisulfite ($S_2O_5$). The terms "color-setting" and "color-set," as used herein, means that the tendency of red-colored salmon roe to discolor, as described above, is deterred for prolonged periods of time, such as the time from packaging and storage of the roe until marketing thereof, for example, periods of about a year or more.

In its preferred practice, the more significant steps of the process comprise the steps of cleansing the salmon roe, subjecting the roe to a brine solution containing citrate or sulfite, most preferably a combination of citrate and sulfite, preferably until the roe has a salt content of at least about 5 wt. percent, and draining excess liquid from the roe. In the preferred procedure, one or more other steps are also involved, as will appear from the following detailed description of a typical technique for producing the desired end-product, in accordance with the invention.

DETAILED DESCRIPTION OF THE INVENTION

As mentioned above, the color-set material of the present invention comprises an edible citrate and/or sulfite ($SO_3$), including also bisulfite, hydrosulfite, and metabisulfite. The use of either the citrate or sulfite compound by itself is effective in preserving the reddish salmon roe color when the roe are treated therewith. However, it is preferred that the salmon roe be treated with a mixture of citrate and sulfite compounds because such a mixture is effective in retaining to a higher degree the original red color of the roe than the individual use of either the citrate or sulfite compound.

The salmon roe can be treated with the citrate and/or sulfite compound in any suitable way, for example, by treating it with an aqueous solution of citrate and/or sulfite compounds. It has been found very convenient to treat the salmon roe with an aqueous brine solution containing citrate and/or sulfite, as will be described in detail hereinbelow.

An aqueous solution of the color-set additive can be prepared by dissolving suitable quantities of water soluble citrate and/or sulfite compounds in water. Although other water soluble compounds, such as the acids thereof, can be used, excellent results have been achieved by utilizing alkali metal sulfites and citrates, for example, sodium and potassium salts thereof. The use of these salts is preferred.

The salmon roe should be treated with the citrate or sulfite compound, or a mixture thereof, in a manner such that the concentration of the color-set material in the treated roe is sufficient to maintain the red color of the roe. The amount of color-set material in the roe to accomplish this will tend to vary depending on various factors, including, for example, the particular species of salmon from which the roe is obtained and the condition or freshness of the roe at the time of treatment. It is recommended that for a specific operation the effective amounts of citrate, sulfite, or mixture thereof be determined initially by treating a sample of the roe. For guideline purposes, it is recommended that the roe be treated in a manner such that the concentration of citrate or sulfite in the finished roe is respectively at least about 300 ppm and at least about 125 ppm. The treated roe can contain higher amounts of citrate and/or sulfite, the values of which will generally be dictated by economic considerations and the tolerable levels permitted by governmental agencies. In general, the incremental improvements obtained by using amounts in excess of about 700 ppm of citrate and/or 500 ppm of sulfite do not justify the use of amounts of the color-set additive in excess of said values. To achieve the aforementioned concentrations of the color-set additive in the treated roe, the roe can be subjected to an aqueous solution of the additive containing appropriate amounts thereof, for example, an aqueous solution containing about 0.15 to about 0.3 wt. percent of citrate or about 0.05 to about 0.2 wt. percent of sulfite or an aqueous solution containing a mixture of the additives, in amounts within the aforementioned ranges. When using bisulfite, hydrosulfite or metabisulfite compounds, the amounts thereof should be sufficient to provide the aforementioned concentrations of sulfite, that is, the amounts thereof are calculated on the basis of the $SO_3$ concentrations taught hereinabove.

There follows a description of the preferred manner of preparing salmon roe for storage and/or shipment. It should be understood that the color-set materials of the present invention can be used to treat salmon roe by methods other than the preferred method described hereinafter.

Although the invention may be utilized with red colored frozen salmon roe, in the preferred practice skeins of red salmon roe, while still fresh, are initially cleansed by being rinsed with fresh water, and thereafter rinsed in a salt (NaCl) solution, preferably at a concentration in the neighbourhood of about 3 wt. percent. The skeins are then drained to free them of excess brine. They are thereafter placed in a brine solution containing a color-set additive or additives of the present invention, and are agitated in said solution until the salt contained in the roe reaches a minimum of about 5 wt. percent, and preferably a salt content within the range of about 8 to about 10 wt. percent. The brining time for reaching this concentration depends upon the size of the skeins and upon the maturity of the roe, the time increasing with size and with maturity.

Although the use of a saturated brine solution (100° salometer) is preferable, a slightly weaker solution may be used. (A saturated brine solution is typically prepared by dissolving 35.86 pounds of pure salt in 100 pounds of water at 60°F.)

Although other temperatures can be used, normally, the temperature of the brine solution, which it is noted is alkaline, should be between about 50° and about 60°F (preferably near about 60°F). By way of example, the brining time, with a saturated solution, can be about 20 minutes when the salt content in the roe is to be about 8.0 wt. percent or more. With weaker brine solutions, and/or at lower temperatures, the time should be increased. Differences in species, size and condition of the salmon roe may also require changes in brining time, determinable by ready experiment.

The color-set additive of the present invention can be incorporated conveniently in the brine solution described above for the purpose of treating the salmon roe therewith. For example, the brine solution can contain about 0.15 to about 0.3 wt. percent citrate and/or about 0.05 to about 0.2 wt. percent of sulfite. (The weight percent of the citrate and sulfite is calculated on the basis of the weight of the water in the brine solution.) Particularly good results have been obtained when the concentration of citrate is about 0.20 wt. percent and the concentration of the sulfite is about 0.15 wt. percent. (This can be accomplished, for example, by using a brine solution containing about 0.35 wt. percent of sodium citrate and/or about 0.25 wt. percent of sodium sulfite.) By using such brine solutions containing the color-set additive of the present invention, there can be imparted to the treated roe about 300 to about 700 ppm of citrate and/or about 125 to about 500 ppm of sulfite.

The agitation of the skeins of roe within the brine solution containing the color-set additive or additives is preferably rather gentle, and is typically done in a vessel wherein there is a rotary agitator operating at about 20 rpm.

After the skeins of salmon roe are removed from the aforementioned brine solution and allowed to drain, they can be graded for color and size and then be promptly packed for immediate low-temperature shipment or storage, preferably in wooden boxes containing liners of parchment or plastic, at which stage the product can be further treated with fine salt, for example, approximately 100 grams per 22 pounds of roe.

Although not essential, the packed roe can be matured, prior to low-temperature storage, by being allowed to stand at room temperature for approximately a day or two, or even three to six days, depending upon the temperature. The temperature may desirably be between about 55° and about 75°F—being preferably held close to about 60°F. The time of the maturation will bear an inverse ratio to the temperature. Near the higher portion of the temperature range, the maturation may be about 1 to 3 days, and in the lower portion of the temperature range, the maturation may be for about 4 to about 6 days.

If maturation is done, the salmon roe is thereafter carefully examined for color and condition, and if necessary repacked.

The packed (or repacked) salmon roe is desirably coated with vegetable oil, as by applying such coating on the top surface layer of the product, after which the lids are applied (or re-applied) to the boxes and tightly fastened down; and the boxed product is then subjected to a low-temperature environment, and held at such temperatures during storage and/or shipment. The low temperatures employed may be between about 10 and about 20°F, but should be considerably lower, preferably in the sub-zero range, if the products are being preserved for any extended period of time, for example, a temperature within a range of about −4° to about −10°F is especially effective.

In the normal course of marketing, and delivery to the consumer, the resulting salmon roe has its normal original appearance, or in many cases, an enhanced appearance, especailly as to color, and is tasty, palatable and wholesome.

EXAMPLES

Examples which follow are illustrative of the practice of the present invention. Comparative examples are set forth also.

Unless stated otherwise, fresh red salmon roe is subjected to the following treatment steps:
1. rinsed with fresh water;
2. rinsed with a 3 wt. percent salt (NaCl) solution, withdrawn therefrom and allowed to drain;
3. placed in a saturated brine solution containing, or not containing, the color-set materials of the present invention, as indicated in the examples below;
4. agitated in the brine solution until the salt content thereof is about 8 to about 10 wt. percent;
5. removed from the brine solution and allowed to drain; and
6. stored in a suitable container at a temperature of about −10°F for a 4 month period.

COMPARATIVE EXAMPLE A

Roe is treated according to Steps (1) to (6) above. No color-set material is used. After 4 months of storage, visual examination of the roe shows that it is brown in color.

COMPARATIVE EXAMPLE B

Roe is treated according to Steps (1) to (5) above, with no color-set material being used. After the roe was removed from the brine solution and allowed to drain (Step (5)), it was stored at a temperature of about 60°F. Within 2 days, the red-colored roe had faded and a brown coloration could be detected.

EXAMPLE 1

A saturated brine solution containing about 0.35 percent sodium citrate by weight of water in the brine is used in Step (3) above. After a 4 month period, the roe was visually examined and it was found that the color of the roe was red and appreciably comparable to the red color of the roe before it was subjected to cold storage.

EXAMPLE 2

A saturated brine solution containing about 0.2 percent sodium sulfite by weight of water in the brine is used in Step (3) above. After a 4 month period, the roe was examined visually and it was found that the color of the roe was red and appreciably comparable to the red color of the roe before it was subjected to cold storage.

EXAMPLE 3

A saturated brine solution containing about 0.35 percent sodium citrate and about 0.25 wt. percent sodium sulfite by weight of water in the brine solution is used in Step (3) above. After a 4 month period, visual examination of the roe showed that it was red in color and was even more appreciably comparable to the red color of the roe before it was subjected to cold storage than the roe of Examples 1 and 2.

EXAMPLES 4 to 6

The procedures of Examples 1 to 3 are repeated, except that prior to cold storage, the roe are first subjected to a 6-day period of storage at about 60°F. Visual inspections of the roe at the end of the 6-day period and at the end of the 4 month cold storage period show that the roe are red in color, with the roe treated with the solution of both citrate and sulfite being more comparable in color to the roe prior to cold storage than those treated with the solutions containing citrate or sulfite only.

It should be pointed out that the impregnation of the salmon roe with one or more of the color-setting or enhancing materials of the present invention is rendered very simple, effective, and uniform as to final concentration, when it is done as a part of the brining operation. It is believed that the citrate and sulfite function to prevent the formation of brown Heme pigment metmyoglobin in the roe. Further, the results are especially good when both a citrate and sulfite are employed in combination.

The examples are intended as illustrative of the preferred embodiment of the invention, and the invention is not to be limited except by the claims, as given the broadest construction consistent with differentiation from the prior art.

I claim:

1. A process for preserving the reddish color of salmon roe comprising impregnating red colored salmon roe with a non-toxic water soluble citrate or sulfite, in an amount sufficient to maintain the reddish color of said roe.
2. The process of claim 1 wherein said roe is impregnated with said citrate.
3. The process of claim 1 wherein said roe is impregnated with at least about 300 ppm of citrate.
4. The process of claim 1 wherein said roe is impregnated with said sulfite.
5. The process of claim 1 wherein said roe is impregnated with at least about 125 ppm of sulfite.
6. The process of claim 1 wherein said roe is impregnated with said citrate and said sulfite.
7. The process of claim 6 wherein said roe is impregnated with at least about 300 ppm of said citrate and at least about 125 ppm of sulfite.

8. The process of claim 1 wherein said roe is treated with an aqueous solution of said citrate or said sulfite or a mixture thereof.

9. The process of claim 1 wherein said roe is treated with an aqueous solution of at least about 0.15 wt. percent of citrate.

10. The process of claim 9 wherein said solution is prepared from sodium or potassium citrate.

11. The process of claim 8 wherein said roe is treated with an aqueous solution of at least about 0.05 wt. percent sulfite.

12. The process of claim 11 wherein said solution is prepared from sodium or potassium sulfite.

13. The process of claim 8 wherein said solution contains a mixture of said sulfite and citrate.

14. The process of claim 8 wherein said solution is a brine solution.

15. The process of claim 14 wherein said roe is treated with said brine solution until the roe has a salt content of at least about 5 wt. percent.

16. The process of claim 15 including subjecting the treated roe to subfreezing temperatures.

17. Red colored salmon roe containing added citrate or sulfite or a mixture thereof in an amount adequate to preserve the reddish color of said roe.

18. Roe according to claim 17 which is also brined.

19. Fish roe containing added citrate or sulfite or a mixture thereof in an amount adequate to preserve the color of said roe.

20. Fish roe according to claim 19 which is also brined.

* * * * *